455-603 AU 233 EX
FIP8106 OR 4,218,681

United States Patent [19] [11] 4,218,681
Hörmann [45] Aug. 19, 1980

[54] HAND-HELD TRANSMITTER FOR TRANSMITTING DIFFERENT SIGNALS

[75] Inventor: Michael Hörmann, Steinhagen, Fed. Rep. of Germany

[73] Assignee: Hörmann KG, Fed. Rep. of Germany

[21] Appl. No.: 11,844

[22] Filed: Feb. 13, 1979

[30] Foreign Application Priority Data

Feb. 13, 1978 [DE] Fed. Rep. of Germany ... 7804106[U]

[51] Int. Cl.[2] .............................................. H04B 7/00
[52] U.S. Cl. ................................ 455/603; 340/147 C
[58] Field of Search .............................. 343/225, 228; 340/147 R, 147 B, 147 C, 147 CV; 325/37

[56] References Cited

U.S. PATENT DOCUMENTS 3,363,250 1/1968 Jacobson .............................. 343/225

*Primary Examiner*—Alvin H. Waring
*Attorney, Agent, or Firm*—Craig & Antonelli

[57] ABSTRACT

A hand-held transmitter for the wireless transmitting of signals for operating remote-controlled garage door installations or the like is disclosed. The transmitter comprises a signal generating device, an energy source, and a hand-operable transmitter switch built into the transmitter housing. The transmitter is capable of selectively transmitting at least two different signals and includes a switch which is position-dependent with respect to the force of gravity for selecting one of said at least two different signals to be transmitted.

8 Claims, 5 Drawing Figures

HAND-HELD TRANSMITTER FOR TRANSMITTING DIFFERENT SIGNALS

BACKGROUND AND SUMMARY OF THE INVENTION

The invention relates to a hand-held transmitter for the wireless transmitting of signals for operating remote-controlled garage door installations or the like comprising a signal generating device, an energy source, and a hand-operable transmitter switch built into the transmitter housing.

Hand-held transmitters of this kind are known, and operate for example with an electric power supply in the form of a 9-volt battery, and allow a garage door, fitted with an appropriate receiver, to be opened or closed by means of electrical propulsion energy with the aid of a transmitted signal (for example, German Gebrauchsmusterschrift 76 26 730).

In particular, such hand-held transmitters should be made so small and handy that they can be carried around conveniently. It should be noted in this regard that modern electronics make it possible to build such transmitters in a very small space. In addition, the electrical power supply can be provided in relatively little space. On the other hand, the operating elements are of critical importance, especially the required hand-operable transmitter switch, for example, a pushbutton, which must not exceed certain dimensions because of the dimensions of the human hand.

It is often necessary to use at least two different receivers, one for each door of a two-door garage, or a driveway gate and a separate garage door. Different doors of this type should be openable selectively, in other words, the same signal should not open both doors. The reason for this may be that the owners may be different, or for safety reasons and the like.

From a consideration of space limitation it would be advantageous to provide a transmitter which emits two different signals, for example two electromagnetic signals of different frequencies. Since the two signals would not have to be transmitted simultaneously as a rule, the different transmitting frequencies could be easily obtained by modifying the oscillator circuit through changes in the circuit. The important point is that two different "on" states must be provided.

It would be possible to make these two different signal states capable of being selected with the aid of two switches, especially pushbutton switches. However, this would go against the desired effort to make the device small.

Thus, an object of the present invention is to provide a hand-held transmitter of the type described hereinabove, with the aid of which at least two different signal states can be set, without necessitating a corresponding number of switching devices accessible from the surface of the housing.

This object is achieved according to the present invention by providing in a hand-held transmitter for the wireless transmitting of signals for operating remote-controlled garage door installations or the like comprising a signal generating device, an energy source, and a hand-operable transmitter switch built into the transmitter housing, the improvement comprising means for selectively transmitting at least two different signals, said means including a switch which is position-dependent with respect to the force of gravity for selecting one of said at least two different signals to be transmitted.

The position-dependent switch provided according to the invention makes it possible to transmit at least two different signals with only one hand-operable transmitter switch such as a pushbutton. The position-dependent switch can be mounted at a fixed position nearly anywhere inside the housing, without affecting the shape of the housing, especially the outside, in any way. A single hand-operable transmitter switch such as a pushbutton accessible from the surface of the housing is sufficient, and can be provided at a convenient point so that the housing has the smallest possible dimensions.

The position-dependent switch can be a simple working contact or, in a preferred embodiment, a switching contact. In both cases, the switching states, associated with the different signals, are distinguished by virtue of the fact that the entire hand-held transmitter and the position-dependent switch mounted on the hand-held transmitter housing, assume two different positions in space with respect to gravity. These two positions are not critical, since only an unstable transition state must be provided. For example, a first transmitting position can be defined by virtue of the fact that the housing assumes an approximately horizontal position with its broad sides. In this position, the first transmitting frequency is emitted by pressing the pushbutton. On the other hand if the unit is raised to a vertical position, pushing on the same pushbutton will transmit the second frequency. However, when the unit is in a vertical position, for example, swiveling it through approximately 90° through a certain perpendicular will differentiate between the two switching positions. There are many possiblities here, and no special details need be provided.

The position-dependent switch is characterized by a gravity-dependent switching element. In one preferred embodiment, the actual gravity-dependent switching element is a mercury filling which distinguishes between two different switching states as a function of gravity and the position of the hand-held transmitter in space. Such mercury switches are know of themselves, but with different designs, such that these switches are swivelably mounted on a fixed housing by means of electromagnetic forces or the like.

To operate a hand-held transmitter of the present invention, primary cells can be employed which have to be replaced after a certain period of operation. Secondary cells can also be used, which can be recharged with the aid of a charger. In any case, it is important for a certain minimum energy to be available to operate the transmitter. In order to display the functional readiness of the device and hence to detect any malfunctions in the condition of the power supply, according to the present invention, the unit is preferably provided with an optical power monitoring device. In one preferred embodiment, a light-emitting diode (LED) is used which, preferably when the pushbutton is actuated, shows whether the power supply still has enough energy in it.

BRIEF DESCRIPTION OF THE DRAWINGS

These and further objects, features and advantages of the present invention will become more apparent from the following description when taken in connection with the accompanying drawings which show, for purposes of illustration only, one embodiment in accordance with the present invention and wherein.

DETAILED DESCRIPTION OF THE DRAWINGS

Figure 1:
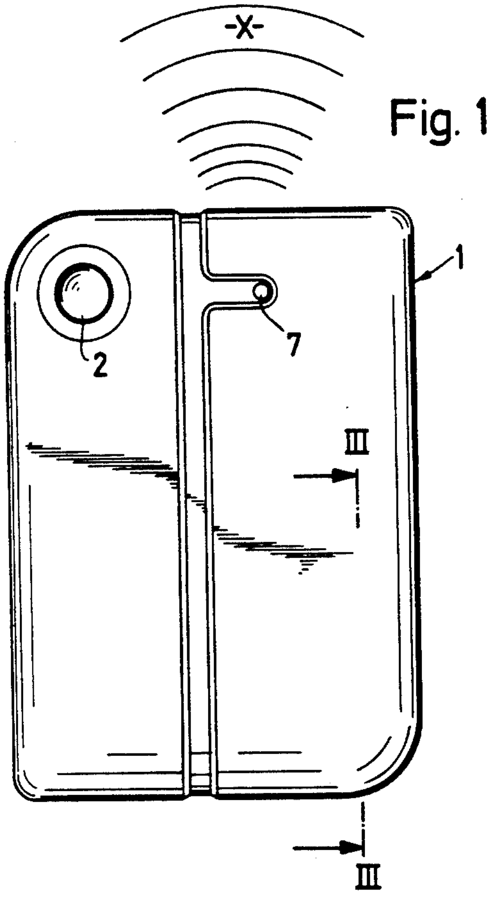
FIG. 1 is a view of the wide side of one preferred embodiment of the hand-held transmitter of the present invention.
Figure 2:
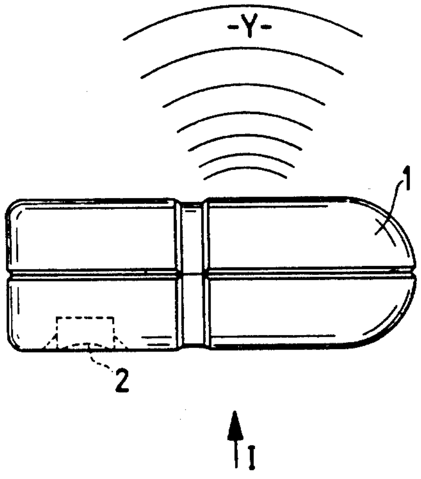
FIG. 2 is an end view of the embodiment shown in FIG. 1.

FIGS. 1 and 2 illustrate the external appearance of one preferred embodiment of the hand-held transmitter of the present invention. It consists of a two-part housing represented as a whole by 1, the housing being provided on its wide side with a pushbutton 2. Inside the housing, a transmitter (not shown) is installed in such manner that two different electromagnetic frequencies can be transmitted as signals after the oscillator circuit is switched. Push-button 2 turns-on the transmitter.

Figure 3:
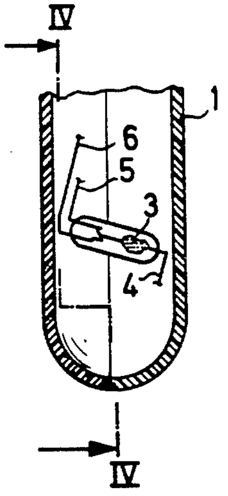
FIG. 3 is a partially cut away view taken along line III—III in FIG. 1.
Figure 4:
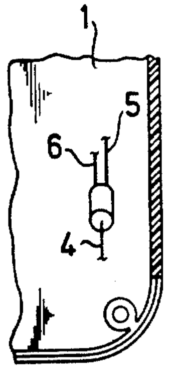
FIG. 4 is a partially cut away view taken along line IV—IV in FIG. 3.

FIGS. 3 and 4 show a mercury switch mounted inside the housing and attached firmly thereto, said switch being provided with three terminals. In the position shown in FIG. 3, mercury switching element 3 connects contacts 4 and 5 under the influence of gravity. When the unit is tipped out of the positon shown in such manner that the mercury switching element runs to the other end of the glass tube under the influence of gravity, contacts 5 and 6 are connected together while the connection between contacts 4 and 5 is interrupted. This is a clear method in switching technology to distinguish between different switching states. This solution from switching technology is employed to change the transmitting frequency of the transmitter, so that in one switching state (contacts 4 and 5 connected) the transmitter operates on a first transmitting frequency, while in the second switch position it transmits a second frequency. It poses no problem to an individual skilled in the art to use these different switching states to transmit two different frequencies. This can be accomplished basically by virtue of the fact that two different transmitters are connected optionally and/or as a function of position such as transmitters A and B in FIG. 5, but a simpler approach can be used as well, namely, by changing the oscillator circuit, only the oscillator frequency passing through the mercury switch can be changed between two different oscillator frequencies.

FIGS. 1 and 2 show the different spatial positions of the hand-held transmitter, which produce the two different transmission frequencies. In FIG. 1, the hand-held transmitter is shown with its broad side in a horizontal position, and transmission frequency X is transmitted by pushing button 2. In FIG. 2 on the other hand, the transmitter is shown vertical. By pushing on the same pushbutton 2, the hand-held transmitter emits frequency Y. Of course, other spatial positions can be used, in fact any in which a switch assumes different switching positions under the influence of gravity.

Figure 5:
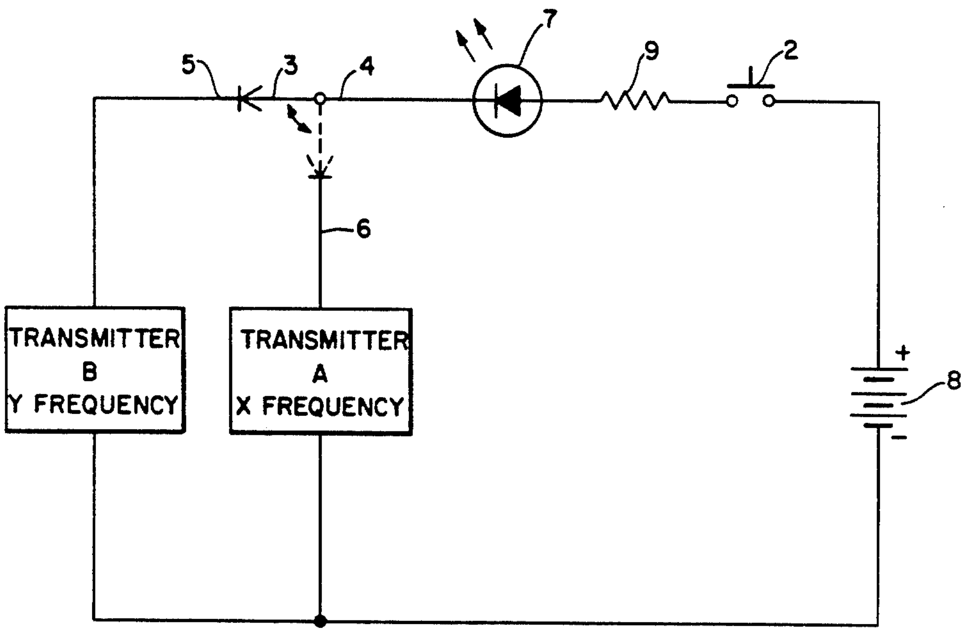
FIG. 5 is a schematic illustration of one circuit diagram for the hand-held transmitter of FIG. 1.

An electrical energy source in the form of a primary cell or a secondary cell is incorporated in the hand-held transmitter (said energy source not being shown) see for example battery B in FIG. 5. If the voltage from this energy source drops below a certain value, the transmitter will no longer operate. This is often the cause of complaint, for which reason an effort has been made to display the operationally ready state. For this purpose, the embodiment of the hand-held transmitter is provided with a light-emitting diode(LED) 7. This LED is connected in series with a resistor 9 and no longer lights when the voltage from the energy source 8 drops below a certain value. The circuit can be designed so that the luminous diode 7 lights when pushbotton 2 is pressed as shown in FIG. 5.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. In a hand-held transmitter for the wireless transmitting of signals for operating remote-controlled garage door installations or the like comprising a signal generating device, an energy source, and a hand-operable transmitter switch built into the transmitter housing, the improvement comprising means for selectively transmitting at least two different signals, said means including a switch which is position-dependent with respect to the force of gravity for selecting one of said at least two different signals to be transmitted.

2. The hand-held transmitter according to claim 1, wherein the switch which is position-dependent with respect to the force of gravity is a mercury switch.

3. The hand-held transmitter according to claims 1 or 2, wherein the switch which is position-dependent with respect to the force of gravity has at least three contacts.

4. The hand-held transmitter according to claims 1 or 2, wherein the switch is position-dependent with respect to the force of gravity is fixedly connected directly on the inside wall of the transmitter housing whereby the position thereof is changed by changing the orientation of the transmitter housing with respect to the force of gravity.

5. The hand-held transmitter according to claims 1 or 2, wherein an energy source monitoring device is mounted on the transmitter housing.

6. The hand-held transmitter according to claim 5, wherein the energy source monitoring device is a light-emitting diode.

7. The hand-held transmitter according to claim 1, wherein said means for selectively transmitting at least two different signals comprises at least two differnet transmitters which are alternately connected for signal transmission by said switch which is position-dependent with respect to the force of gravity.

8. The hand-held transmitter according to claim 1, wherein said means for selectively transmitting at least two different signals comprises an oscillator circuit, said switch which is position-dependent with respect to the force of gravity changing said oscillator circuit to effect transmission of different signals.

* * * * *